(12) United States Patent
Amano

(10) Patent No.: US 8,520,132 B2
(45) Date of Patent: Aug. 27, 2013

(54) IMAGE PICKUP APPARATUS, CONTROL METHOD THEREFOR AND STORAGE MEDIUM

(75) Inventor: Ken-ichiro Amano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 337 days.

(21) Appl. No.: 13/001,100

(22) PCT Filed: Aug. 25, 2009

(86) PCT No.: PCT/JP2009/065140
§ 371 (c)(1),
(2), (4) Date: Dec. 23, 2010

(87) PCT Pub. No.: WO2010/024425
PCT Pub. Date: Mar. 4, 2010

(65) Prior Publication Data
US 2011/0109775 A1    May 12, 2011

(30) Foreign Application Priority Data

Sep. 1, 2008 (JP) ................................. 2008-223575

(51) Int. Cl.
H04N 5/232 (2006.01)
(52) U.S. Cl.
USPC ........................................... 348/349; 348/345
(58) Field of Classification Search
USPC ......................... 348/345, 349, 354, 355, 255
See application file for complete search history.

(56) References Cited

U.S. PATENT DOCUMENTS

| 6,249,317 | B1 * | 6/2001 | Hashimoto et al. | 348/364 |
| 6,781,632 | B1 | 8/2004 | Ide | |
| 6,829,008 | B1 | 12/2004 | Kondo et al. | |
| 7,711,261 | B2 | 5/2010 | Kusaka | |
| 2007/0237512 | A1 | 10/2007 | Kusaka | |
| 2009/0256952 | A1 * | 10/2009 | Kusaka | 348/349 |
| 2010/0238343 | A1 * | 9/2010 | Kawarada | 348/345 |
| 2011/0122309 | A1 * | 5/2011 | Sato | 348/345 |

FOREIGN PATENT DOCUMENTS

| EP | 0981245 B | 1/2006 |
| JP | 2000-156823 A | 6/2000 |
| JP | 2000-305010 A | 11/2000 |
| JP | 3592147 B | 9/2004 |
| JP | 2007-124056 A | 5/2007 |
| JP | 2007-282109 A | 10/2007 |

* cited by examiner

Primary Examiner — Tuan Ho
(74) Attorney, Agent, or Firm — Cowan, Liebowitz & Latman, P.C.

(57) ABSTRACT

An image pickup apparatus capable of capturing a still image while a high sharpness is being maintained and a reduction in image quality due to the existence of a focus detecting pixel is being suppressed. An image pickup device includes an image pickup pixel group and a focus detecting pixel group. A calculation unit calculates a singular value in the signal values of pixels existing around the focus detecting pixel group. An adjustment unit adjusts a gain of signal values in the focus detecting pixel group. A correction unit corrects an image data corresponding to the position of the focus detecting pixel group based on the signal values in the image pickup pixel group. A determination unit determines the amount of adjusting the gain of signal values in the focus detecting pixel group and the amount of correction based on the results calculated by the calculation unit.

6 Claims, 6 Drawing Sheets

FIG. 2

| R | G | R | G | R | G | R | G |
|---|---|---|---|---|---|---|---|
| G | B | G | B | G | B | G | B |
| R | G | R | G | R | G | R | G |
| S1 | B | S1 | B | S1 | B | S1 | B |
| R | G | R | G | R | G | R | G |
| S2 | B | S2 | B | S2 | B | S2 | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| S1 | B | S1 | B | S1 | B | S1 | B |
| R | G | R | G | R | G | R | G |
| S2 | B | S2 | B | S2 | B | S2 | B |
| R | G | R | G | R | G | R | G |
| G | B | G | B | G | B | G | B |

FIRST RANGE FINDING POINT

SECOND RANGE FINDING POINT

| R | G | R | G | R | G | R | G | } ROW OF NORMAL COLOR ARRANGEMENT |
| G | B | G | B | G | B | G | B |
| R | G | R | G | R | G | R | G | } ROW INCLUDING FIRST PHASE DIFFERENCE SENSOR |
| S1 | B | S1 | B | S1 | B | S1 | B |
| R | G | R | G | R | G | R | G | } ROW INCLUDING SECOND PHASE DIFFERENCE SENSOR |
| S2 | B | S2 | B | S2 | B | S2 | B |
| R | G | R | G | R | G | R | G | } ROW OF NORMAL COLOR ARRANGEMENT |
| G | B | G | B | G | B | G | B |

PRIOR ART

PRIOR ART

IMAGE PICKUP APPARATUS, CONTROL METHOD THEREFOR AND STORAGE MEDIUM

TECHNICAL FIELD

The present invention relates to, for example, an image pickup apparatus such as a digital camera, a control method therefor, and a storage medium storing a program for implementing the method.

BACKGROUND ART

Conventionally, there has been proposed an image pickup apparatus which eliminates the need for a secondary optical system for detecting a focus by changing optical characteristics of a part of pixels in an image pickup device for imaging an object differently from optical characteristics of other pixels to be used for detecting a focus (See Patent Literature (PTL 1)). In the proposal, phase difference sensors in two kinds are arranged in a part of pixels in the image pickup device.

FIG. 4 is a diagram showing an example of arrangement of pixels in the image pickup device including the phase difference sensors for detecting a focus in specific rows.

In FIG. 4, reference characters R, G, and B respectively denote pixels in which a red, a green, and a blue filter are arranged on a light incidence surface thereof. Reference characters S1 and S2 denote a first and a second phase difference sensor which are different in optical characteristics from each other, used for detecting a focus, and arranged in the image pickup device along with the R, G, and B pixels to obtain color image signals.

FIG. 5 is a diagram schematically showing the structure of the first phase difference sensor S1. In FIG. 5, the first phase difference sensor S1 includes a micro lens 501 arranged over a planar layer 502. The first phase difference sensor S1 further includes a light shielding layer 503 and a photoelectric conversion element 504 which are arranged under the planar layer 502. The light shielding layer 503 has an opening eccentric from the center portion of a photoelectric conversion area of the pixel in a direction to one side (to the left side in FIG. 5) and has a diaphragm function to converge incident light.

FIG. 6 is a diagram schematically illustrating the structure of the second phase difference sensor S2. FIG. 6 is different from FIG. 5 in that the opening of the light shielding layer 503 of the second phase difference sensor S2 is arranged in a position symmetrical with respect to the opening of the light shielding layer 503 of the first phase difference sensor S1 through the center of an optical axis.

In FIG. 4, the more the number of pixels, the more similar the images formed in the row including the first phase difference sensor S1 and the row including the second phase difference sensor S2. When object light is focused on a pixel through an image pickup optical system, the image signals coincide with each other in the row including the first phase difference sensor S1 and the row including the second phase difference sensor S2.

When the object light is out of focus, a phase difference arises between the image signals in the row including the first phase difference sensor S1 and the row including the second phase difference sensor S2. The phase shift arises reversely according to the case where the object light is out of focus toward the front or the rear of a camera. When the image pickup optical system is viewed from the first phase difference sensor S1 and the optical system is viewed from the second phase difference sensor S2, the pupil is seen as if it were divided symmetrically with respect to the center of the optical axis.

FIGS. 7A and 7B are schematic diagrams useful in explaining a phase shift of an image being out of focus. It should be noted that in FIGS. 7A and 7B, the first and the second phase difference sensor S1 and S2 are abstractly made close to each other to be indicated by points A and B. For the sake of easy understanding, the R, G, and B pixels for picking up an image are omitted from the illustration in FIGS. 7A and 7B to show as if the phase difference sensors are aligned.

Light from a specific point of an object is separated into pencil of light rays (ΦLa) passing through the pupil corresponding to A and being incident on the corresponding A and pencil of light rays (ΦLb) passing through the pupil corresponding to B and being incident on the corresponding B. The two pencils of light rays are derived from one point, so that the two pencils of light rays reach one point to which the two pencils of light rays are converged by the same micro lens if the focus of the image pickup optical system is on the surface of the image pickup device (refer to FIG. 7A). However if a focus is at a position of a distance x, for example, in front of the surface, two pencils of light rays are shifted from each other in accordance with a change in incident angle of light (refer to FIG. 7B). If the focus is at a position of a distance x deep therefrom, two pencils of light rays are shifted in a direction opposite to a direction in which the two pencils of light rays are shifted in the former case.

For this reason, if the image pickup optical system is focused, the image signals generated by the arrangement of A and B coincide with each other. If not, the image signals are shifted.

However the image pickup device including the phase difference sensor will lack pixel data corresponding to the position of the phase difference sensor at the time of capturing a still image. When the signal obtained by the phase difference sensor is used as an image signal for a still image, a different visual field lacks continuity between peripheral pixel signals, which looks like a flaw.

To solve such a problem, in the above Patent Literature 1, the image signal corresponding to the position of the phase difference sensor is interpolated by the image signal of peripheral pixels.

In an arrangement of pixels in the image pickup device shown in FIG. 4, interpolation data are inserted into the portions of the phase difference sensors S1 and S2 included in the picked-up image signal from peripheral pixels. In FIG. 4, the R, G, and B pixels used for picking up an image are arranged in a Bayer array and the phase difference sensors S1 and S2 are arranged instead of a part of pixels G. Data of the pixel G lacked due to the existence of the phase difference sensors S1 and S2 is created into a combined pixel G data using data of four pixels G diagonally adjacent thereto and the combined pixel G data is applied to the data of the lacked pixel G.

There has also been proposed an image pickup apparatus which changes over interpolation correction, offset correction and gain correction process according to the defect level of a defect pixel (See Patent Literature (PTL 2)).

CITATION LIST

Patent Literature

{PTL 1} Japanese Patent No. 3592147
{PTL 2} Japanese Laid-Open Patent Publication (Kokai) No. 2007-124056

SUMMARY OF INVENTION

Technical Problem

In the above Patent Literature 1, a pixel of the phase difference sensor is interpolated with adjacent pixels when a still image is picked up to make lower, and thus sharpness in an image in the area adjacent to a phase difference sensor becomes lower than that in images in the other areas.

When an object image low in spatial frequency is received, its difference in visual field from peripheral pixels used for picking up an image makes the image signal of the phase difference sensor more continuous than the image signal of the peripheral pixels used for picking up an image. For this reason, the image signal corresponding to the position of the phase difference sensor is preferably interpolated based on the image signal of the peripheral pixels used for picking up an image. In this case, the low spatial frequency of the object image moderates a reduction in sharpness due to interpolation process.

On the other hand, when an object image high in spatial frequency is received, the image signal corresponding to the position of the phase difference sensor is less continuous than the image signal of the peripheral pixels used for picking up an image. For this reason, the interpolation process makes a reduction in sharpness conspicuous. That is, when an object image high in spatial frequency is received, the correction of gain moderates the existence of the phase difference sensor rather than the interpolation process.

In the above Patent Literature 1, the more the number of the phase difference sensors are increased, the more the image area low in sharpness due to the interpolation process is increased. Therefore, this increases a small-sized image area low in sharpness when an object image high in spatial frequency is received, degrading image quality of a still image to be obtained.

The phase difference sensor is provided with a diaphragm for dividing the pupil on its front face and not provided with a color filter on its light incidence surface. For this reason, when phase difference sensors different in visual field are provided on the image pickup device to detect focuses thereof based on the phase difference therebetween, the image signals output from the phase difference sensors are different in level from the signals of the pixels peripherally located. Therefore, the image signal output from the phase difference sensor cannot be directly used for the still image data.

The present invention provides an image pickup apparatus capable of capturing a still image while a high sharpness is being maintained and a reduction in image quality due to the existence of a focus detecting pixel is being suppressed, a control method therefor and a storage medium storing a program for implementing the method.

Solution to Problem

Accordingly, a first aspect of the present invention provides an image pickup apparatus comprising an image pickup device including an image pickup pixel group and a focus detecting pixel group, a calculation unit for calculating a singular value in the values of signals of pixels existing around the focus detecting pixel group in the image pickup device, an adjustment unit for adjusting a gain of values of signals in the focus detecting pixel group, a correction unit for correcting an image data corresponding to the position of the focus detecting pixel group based on the values of signals in the image pickup pixel group, and a determination unit for determining the amount of adjusting the gain of values of signals in the focus detecting pixel group by the adjustment unit and the amount of correction by the correction unit based on the results calculated by the calculation unit.

Accordingly, a second aspect of the present invention provides an image pickup apparatus comprising an image pickup device including an image pickup pixel group and a focus detecting pixel group, a calculation unit for calculating a singular value in the values of signals of pixels existing around the focus detecting pixel group in the image pickup device, an adjustment unit for adjusting a gain of values of signals in the focus detecting pixel group, a correction unit for correcting an image data corresponding to the position of the focus detecting pixel group based on the values of signals in the image pickup pixel group, and a determination unit for determining the ratio of adjusting the gain of values of signals in the focus detecting pixel group by the adjustment unit and the ratio of correction by the correction unit based on the results calculated by the calculation unit.

Accordingly, a third aspect of the present invention provides a method of controlling an image pickup apparatus including an image pickup device with an image pickup pixel group and a focus detecting pixel group, the method comprising a calculation step of calculating a singular value in the values of signals of pixels existing around the focus detecting pixel in the image pickup device, a adjusting step of adjusting a gain of values of signals in the focus detecting pixel group, a correction step of correcting an image data corresponding to the position of the focus detecting pixel group based on the values of signals in the image pickup pixel group, and a determination step of determining the amount of gain adjustment used in the adjusting step and the amount of correction used in the correction step based on the results calculated in the calculation step.

Accordingly, a fourth aspect of the present invention provides a computer readable storage medium storing a program for causing a computer to execute a control method for controlling an image pickup apparatus including an image pickup device with an image pickup pixel group and a focus detecting pixel group, the control method comprising a calculation step of calculating a singular value in the values of signals of pixels existing around the focus detecting pixel in the image pickup device, a adjusting step of adjusting a gain of values of signals in the focus detecting pixel group, a correction step of correcting an image data corresponding to the position of the focus detecting pixel group based on the values of signals in the image pickup pixel group, and a determination step of determining the amount of gain adjustment used in the adjustment step and the amount of correction used in the correction step based on the results calculated in the calculation step.

Advantageous Effect of Invention

According to the present invention, the ratio of the amount of interpolation correction to the amount of gain adjustment is varied according to situations of peripheral pixels around a defective focus detecting pixel to allow capturing a still image while a high sharpness is being maintained and a reduction in image quality due to the existence of a focus detecting pixel is being suppressed.

The features and advantages of the invention will become more apparent from the following detailed description taken in conjunction with the accompanying drawings.

BRIEF DESCRIPTION OF DRAWINGS

FIG. 2 is a diagram showing an example of arrangement of an image pickup pixel group and a focus detecting pixel group in an image pickup device;

DESCRIPTION OF EMBODIMENTS

An example of an embodiment of the present invention is described below with reference to the drawings.

Figure 1:
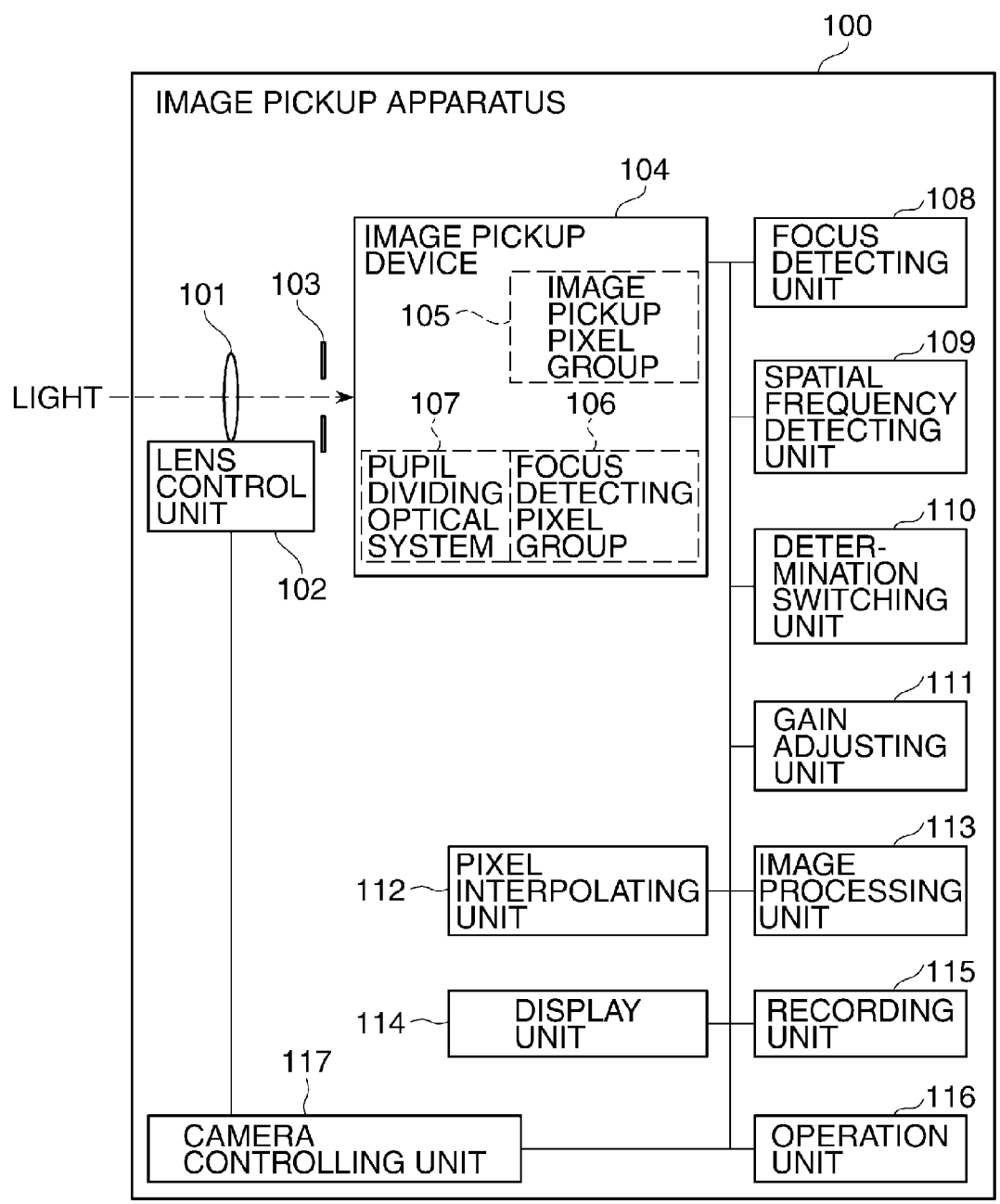
FIG. 1 is a block diagram schematically showing a configuration of an image pickup apparatus as an example of an embodiment of the present invention.

FIG. 1 is a block diagram schematically showing a configuration of an image pickup apparatus as an example of an embodiment of the present invention.

As shown in FIG. 1, an image pickup apparatus 100 of the present embodiment includes a lens 101 for imaging an object, a lens control unit 102 for controlling the focal position of the lens, a diaphragm 103 for adjusting the amount of incident light, and an image pickup device 104 formed of a CMOS sensor.

The image pickup device 104 includes an image pickup pixel group 105, a focus detecting pixel group 106, and a pupil dividing optical system 107.

The image pickup pixel group 105 is a group of pixels on the light receiving surface of which R, G, and B color filters are provided and which is used for obtaining an image signal for picking up an image. The focus detecting pixel group 106 is used for detecting a focus, composed of a plurality of pairs of phase difference sensors arranged symmetrically to each other with respect to an optical axis, and exists in a plurality of focus detection areas. Each pixel in the image pickup pixel group 105 has an image height according to a distance from the center of an image. The term "image height" refers to a height of an image formation position of each pixel from the center of an image thereto. When an axis (taken here as axis y) vertical to the optical axis (taken here as axis x) of the lens is assumed and an intersection point of the axes x and y is assumed to be "o," a distance along the axis y from the intersection point "o" to the image formation position of each pixel is the image height. A plane wave inclined to the optical axis is caused to form an image at a position a distance y away from the optical axis in the focal plane of the lens. The distance y corresponds to the image height. The pupil dividing optical system 107 is an optical system for limiting incident light so that the pupil is divided symmetrically with respect to a pair of the phase difference sensors in the focus detecting pixel group 106 and light is caused to be incident.

The image pickup apparatus 100 further includes a focus detecting unit 108, a spatial frequency detecting unit 109, a determination switching unit 110, a gain adjusting unit 111, a pixel interpolating unit 112, an image processing unit 113, a display unit 114, a recording unit 115, an operation unit 116 and a camera controlling unit 117.

The focus detecting unit 108 detects a focus from the amount of image shift in the pixel array of a pair of the phase difference sensors in the focus detecting pixel group 106. The spatial frequency detecting unit 109 detects the strength of high frequency components of the image signal formed of a plurality of pixels (hereinafter referred to as "adjacent pixel group") positioned in the vicinity of the focus detecting pixel group 106 out of the image pickup pixel group 105.

The determination switching unit 110 determines whether the interpolation process is performed in the pixel interpolating unit 112 based on a focus detection result of the focus detecting unit 108 or on a result of detecting the strength of high frequency components of the spatial frequency detecting unit 109.

Figures 4, 5:
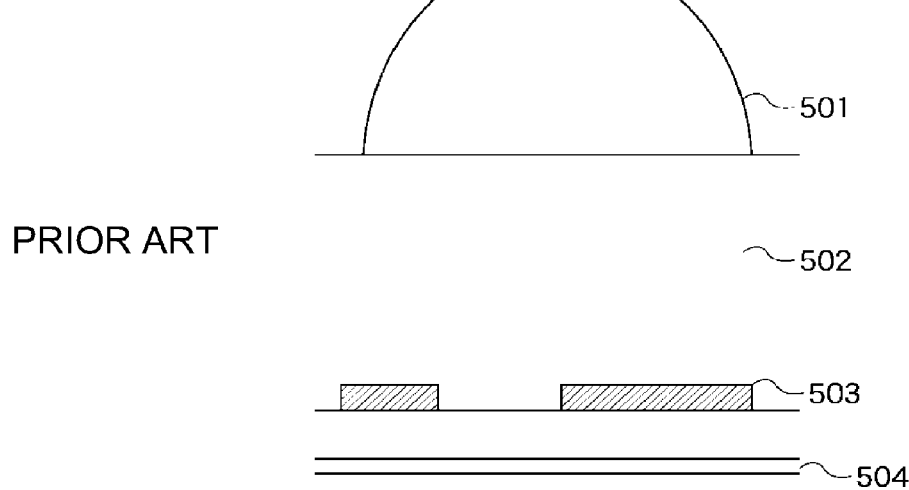
FIG. 4 is a diagram for useful in explaining a conventional example and showing an example of arrangement of pixels in the image pickup device including phase difference sensors for detecting a focus.
FIG. 5 is a diagram schematically showing the structure of a first phase difference sensor.
Figure 6:
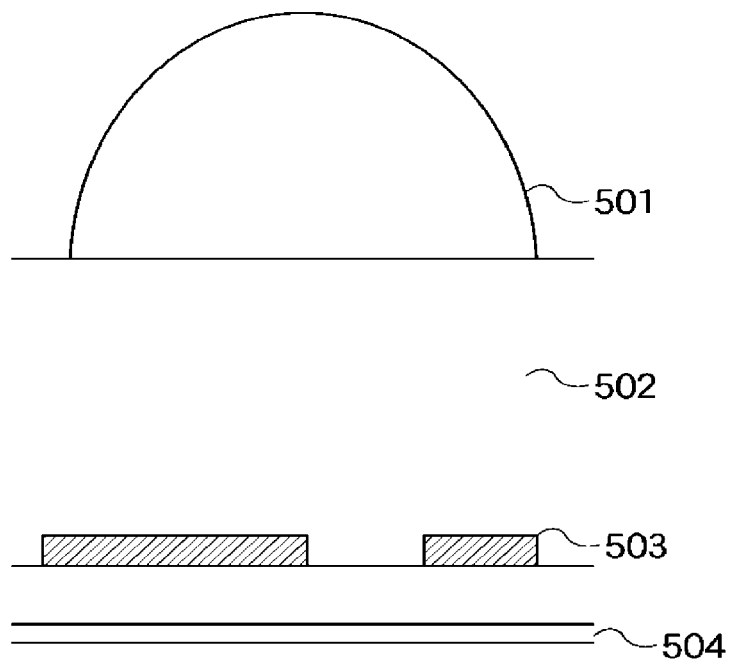
FIG. 6 is a diagram schematically showing the structure of a second phase difference sensor.
Figure 7A:
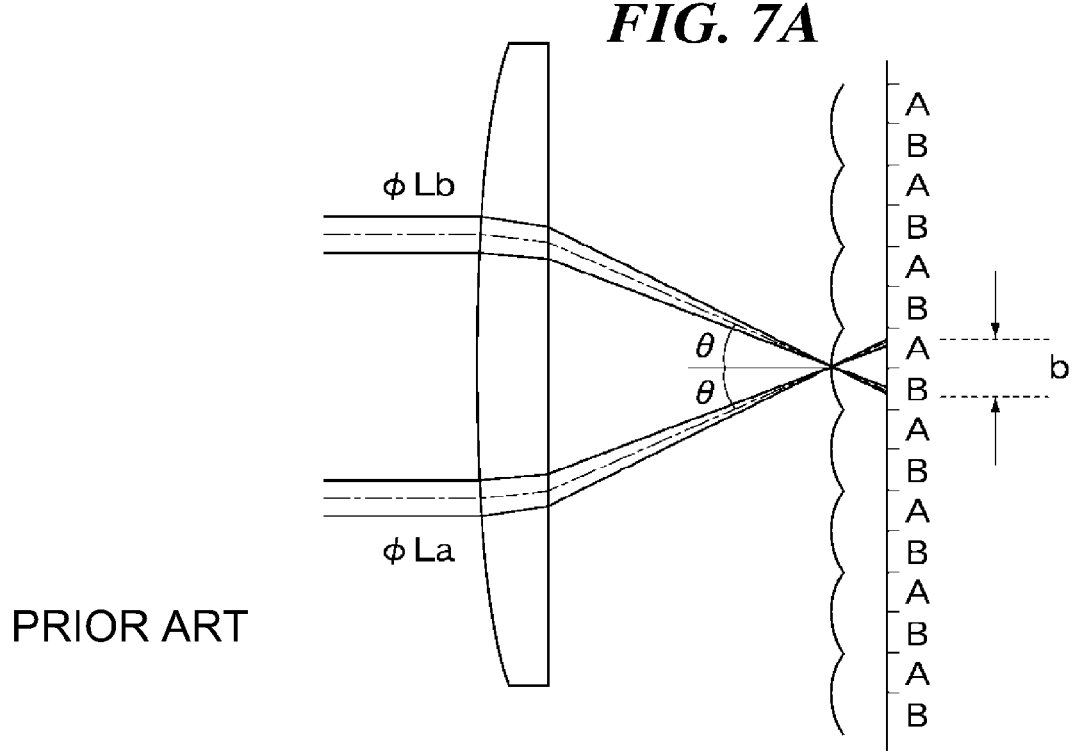
FIGS. 7A and 7B are schematic diagrams useful in explaining a phase shift of an image being out of focus.
Figure 7B:
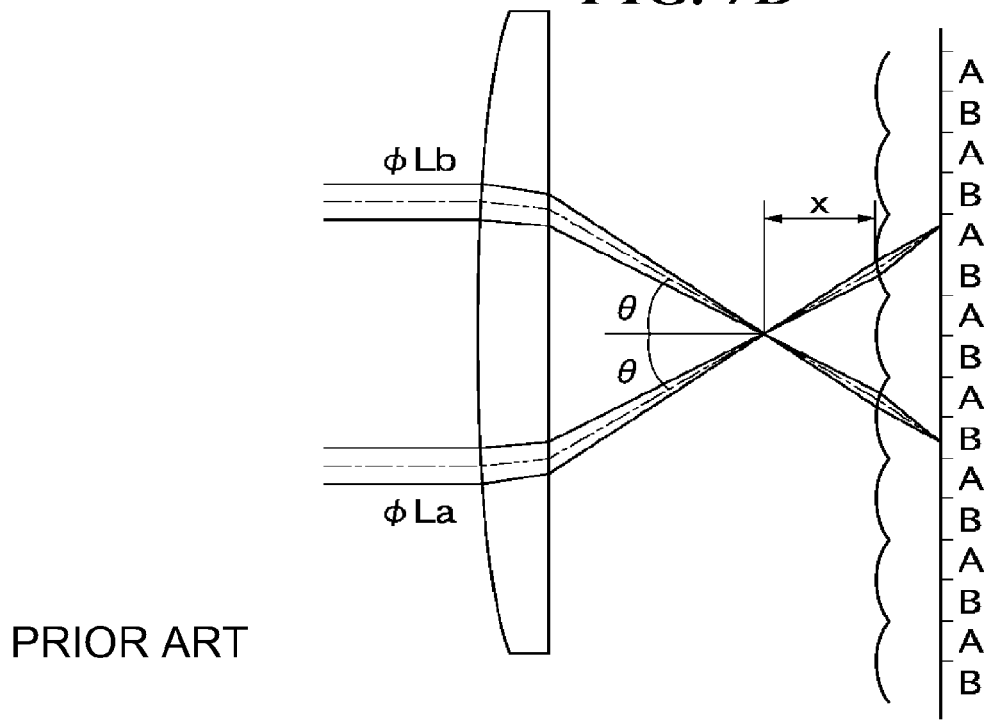

In the focus detecting pixel group 106, the visual field is limited by the light shielding layer 503 (refer to FIGS. 5 and 6) and a color filter is not provided on the light receiving surface thereof, so that the image signal of the focus detecting pixel group 106 is different from that of the adjacent pixel group in level.

For this reason, the gain adjusting unit 111 adjusts the gain of the focus detecting pixel group 106 to cause the image signal of the focus detecting pixel group 106 to be close to the level of the image signal of the adjacent pixel group in level.

The pixel interpolating unit 112 generates image data corresponding to the position of the phase difference sensor in the focus detecting pixel group 106 by interpolation calculation using the image signal of the image pickup pixel group 105 obtained from the image pickup device 104 based on the results determined by the determination switching unit 110.

The image processing unit 113 subjects the image signal output from the image pickup pixel group 105 to gamma correction, white balance adjustment, resampling, and predetermined image compression coding. The recording unit 115 records the image data output from the image processing unit 113. The display unit 114 displays the image data output from the image processing unit 113. The operation unit 116 receives an operation input from an operator. The camera controlling unit 117 controls the entire image pickup apparatus 100.

FIG. 2 is a diagram showing the arrangement of the image pickup pixel group 105 and the focus detecting pixel group 106 in the image pickup device 104.

In FIG. 2, one of a pair of the phase difference sensors in the focus detecting pixel group 106 is denoted by S1 and the other is denoted by S2. The pixels with the same color in the vicinity corresponding to the focus detecting pixel group 106 are indicated by slanting lines. It should be noted that the structure of the phase difference sensors S1 and S2 is similar to that in FIGS. 5 and 6.

One range finding point is formed of a set of a pixel array into which the phase difference sensor S1 is discretely inserted and a pixel array into which the phase difference sensor S2 is discretely inserted, with the pixel arrays spaced out. A first and a second range finding point are shown in the upper and the lower portion of FIG. 2 respectively. The focus detecting unit 108 individually detects a focus at each range finding point.

An example of the operation of the image pickup apparatus according to the present embodiment is described below with reference to FIG. 3. A program stored in ROM or the like is loaded into a RAM to cause a CPU and the like of the camera controlling unit 117 to execute each process in FIG. 3.

Figure 3:
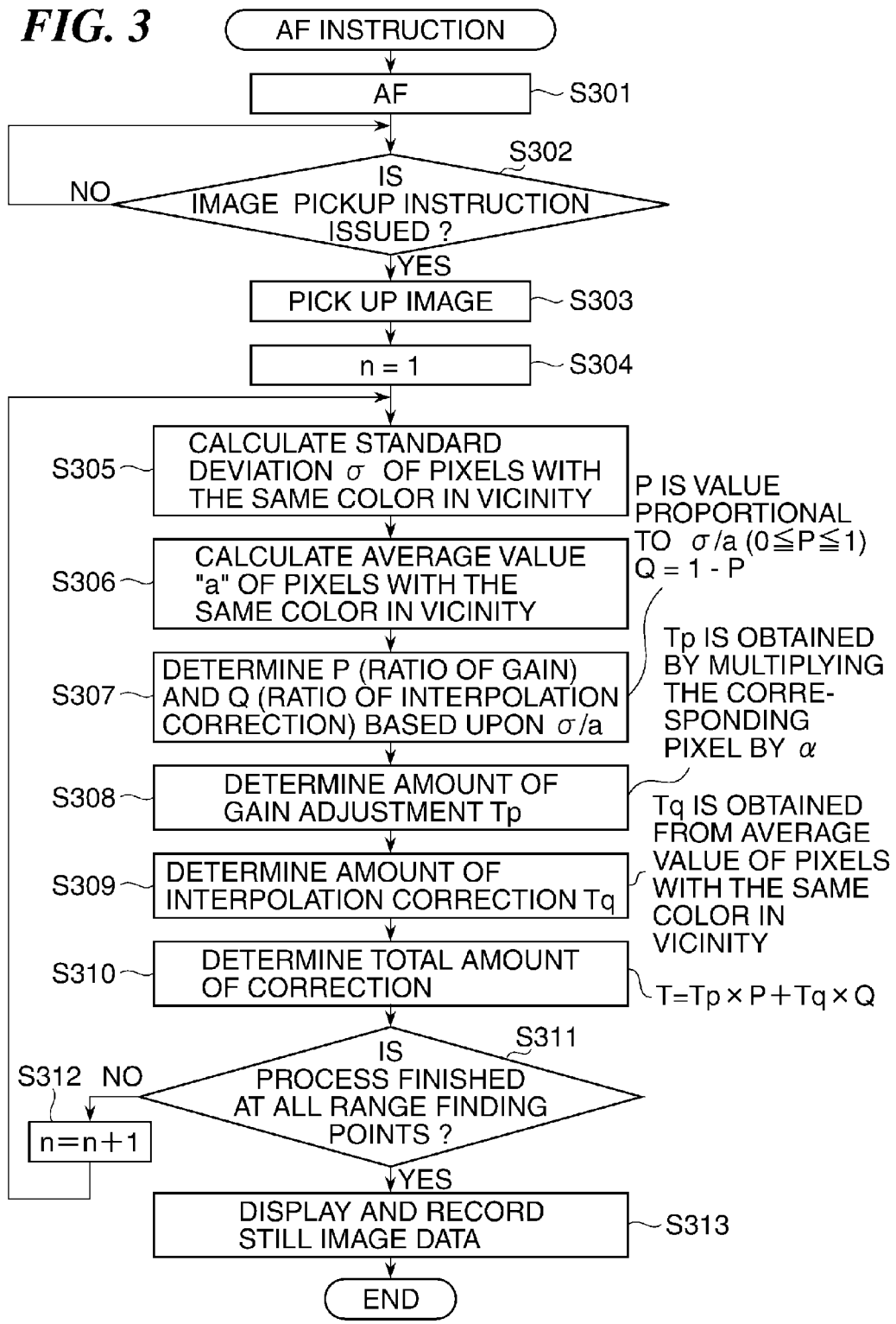
FIG. 3 is a flow chart useful in explaining an example of operation of the image pickup apparatus.

In FIG. 3, the operation input of the operation unit 116 issues an auto-focus (AF) instruction to start step S301. The following description is made on the assumption that exposure is previously controlled before the AF instruction is issued.

In step S301, when the AF instruction is issued, the camera controlling unit 117 controls the image pickup device 104 to accumulate electric charges in the focus detecting pixel group 106. After the accumulation of electric charges is completed, the camera controlling unit 117 outputs the image signal in the focus detecting pixel group 106 to the focus detecting unit 108.

The camera controlling unit 117 outputs the image signal in the focus detecting pixel group 106 to the focus detecting unit 108 and then controls the focus detecting unit 108 to calculate the amount of defocus based upon the amount of image shift in the pixel array of the phase difference sensors S1 and S2 in the focus detecting pixel group 106. The camera controlling unit 117 controls the lens control unit 102 to move the focal position of the lens 101 according to the calculated amount of defocus.

The camera controlling unit 117 moves the focal position of the lens 101 and then performs again an exposure control at a new focal position because exposure conditions may be changed due to change in defocused state of an object image. The process then proceeds to step S302.

In step S302, the camera controlling unit 117 determines whether an image pickup instruction is issued from the operation input of the operation unit 116. If the camera controlling unit 117 determines that the image pickup instruction is issued from the operation input, the process proceeds to step S303.

In step S303, the camera controlling unit 117 accumulates electric charges in the image pickup pixel group 105 and the focus detecting pixel group 106 in the image pickup device 104. After the accumulation of electric charges is completed, the camera controlling unit 117 outputs the image signal in the image pickup pixel group 105 to the spatial frequency detecting unit 109 and the pixel interpolating unit 112 and outputs the image signal in the focus detecting pixel group 106 to the focus detecting unit 108 and the gain adjusting unit 111. The process then proceeds to step S304.

In step S304, the camera controlling unit 117 initializes a counter to determine whether the pixel interpolating unit 112 subjects each range finding point to the interpolation process. A numeric value n of the counter denotes a corresponding range finding point. The camera controlling unit 117 substitutes a value 1 for an initial value of the n to perform setting so that a determination is made as to whether the pixel interpolating unit 112 subjects the first range finding point to the interpolation process. The process then proceeds to step S305.

In step S305, the camera controlling unit 117 calculates a standard deviation σ of the image signals of the pixels with the same color in the vicinity of the corresponding pixel (the phase difference sensor). The process then proceeds to step S306.

In step S306, the camera controlling unit 117 calculates an average value "a" of the image signals of the pixels with the same color in the vicinity of the corresponding pixel. The process then proceeds to step S307.

In step S307, the camera controlling unit 117 determines a ratio P of the amount of gain adjustment and a ratio Q (=1−P) of the amount of interpolation correction based upon σ/a (dispersion; singular value). The process then proceeds to step S308. The dispersion is represented as variation in the value of the image signals of the pixels with the same color in the vicinity. The ratio P of the amount of gain adjustment or the ratio Q of the amount of interpolation correction may be 1. In other words, the image data corresponding to the position of the focus detecting pixel group may be generated only by the gain adjustment or the interpolation correction according to the value of the image signals of the pixels with the same color in the vicinity.

The ratio P is taken as a value proportional to σ/a (however, $0 \leqq P \leqq 1$). Thereby, when the standard deviation σ is small (i.e., when a spatial frequency is low), the ratio P of the amount of gain adjustment becomes small and the ratio Q of the amount of interpolation correction becomes large. On the other hand, when the standard deviation σ is large (i.e., when a spatial frequency is high), the ratio P of the amount of gain adjustment becomes large and the ratio Q of the amount of interpolation correction becomes small.

When the average value "a" is large (which corresponds to the case where a spatial frequency is low), the ratio P of the amount of gain adjustment becomes small and the ratio Q of the amount of interpolation correction becomes large. On the other hand, when the average value "a" is small (which corresponds to the case where a spatial frequency is high), the ratio P of the amount of gain adjustment becomes large and the ratio Q of the amount of interpolation correction becomes small. A correction ratio may be varied according to a distance from the center of a screen. For example, the closer a distance from the center of a screen is, the greater the ratio P of the amount of gain adjustment is made and the smaller the ratio Q of the amount of interpolation correction is made (which corresponds to the case where a spatial frequency is high). Furthermore, the farther a distance from the center of a screen is, the smaller the ratio P of the amount of gain adjustment is made and the greater the ratio Q of the amount of interpolation correction is made (which corresponds to the case where a spatial frequency is low). Herein, the closer a distance from the center of a screen to each pixel of the image pickup pixel group 105 is, the lower the image height becomes. The farther a distance from the center of a screen is, the higher the image height becomes. Therefore, the higher the image height is, the greater the ratio Q of the amount of interpolation correction becomes. The lower the image height is, the greater the ratio P of the amount of gain adjustment becomes. The ratio Q is taken as a value proportional to a distance from the center of a screen (however, $0 \leqq Q \leqq 1$ and P=1−Q). In other words, the higher the image height is, the greater the ratio Q becomes.

In step S308, the camera controlling unit 117 determines the amount of gain adjustment Tp. The process then proceeds to step S309. Where, the amount of gain adjustment Tp is one in which the corresponding pixel is multiplied by the predetermined amount of gain α.

In step S309, the camera controlling unit 117 determines the amount of interpolation correction Tq. The process then proceeds to step S310. Here, the amount of interpolation correction Tq is obtained from an average value of the pixels with the same color around the corresponding pixel.

In step S310, the camera controlling unit 117 calculates Tp×P+Tq×Q according to the ratio P of the amount of gain adjustment and the ratio Q of the amount of interpolation correction obtained in step S307 to determine the total amount of correction. The process then proceeds to step S311.

In step S311, the camera controlling unit 117 determines whether a determination is finished as to whether the pixel interpolating unit 112 subjects all the range finding points to the interpolation correction process.

If the camera controlling unit 117 determines that a determination is not finished with respect to all the range finding points, the process proceeds to step S312. If the camera controlling unit 117 determines that a determination is finished with respect to all the range finding points, the process proceeds to step S313.

In step S312, the camera controlling unit 117 takes the value n of a counter as n=n+1 to determine whether the pixel interpolating unit 112 subjects the following range finding point to the interpolation correction. The process then returns to step S305.

In step S313, the camera controlling unit 117 controls the image processing unit 113 to subject a combined image data to gamma correction, white balance adjustment, resampling, and predetermined image compression coding.

The camera controlling unit 117 outputs the image data subjected to gamma correction, white balance adjustment, and resampling for display by the image processing unit 113 to the display unit 114 and displays the output image data on the display unit 114 so that a user can confirm the picked up image.

The camera controlling unit 117 also outputs the image data subjected to gamma correction, white balance adjustment, resampling for recording and image compression coding by the image processing unit 113 to the recording unit 115 and records the output image data into the recording unit 115.

As described above, in the present embodiment, information on a pixel (phase difference sensor) defective as an image is also utilized as image information, so that the ratios of the amount of interpolation correction and the amount of gain adjustment are varied according to situations of pixels around the pixel. This allows capturing a still image while a high sharpness is being maintained and a reduction in image quality due to the existence of the phase difference sensor is being suppressed.

In the above embodiment, the ratio Q of the amount of interpolation correction and the ratio P of the amount of gain adjustment are determined based on dispersion (or, spatial frequency) of the values of the image signals of the pixels with the same color in the vicinity. However, the present invention is not limited to the above, but the ratios of the amount of interpolation correction and the amount of gain adjustment may be determined based on whether the values of the image signals of the pixels with the same color in the vicinity have portions high in contrast (based on a singular value). If the values of the image signals of the pixels with the same color in the vicinity have portions high in contrast (in other words, the values have edges), the ratio of the amount of interpolation correction is decreased and the ratio of the amount of gain adjustment is increased. If the values of the image signals of the pixels with the same color in the vicinity have portions low in contrast (in other words, the values do not have edges), the ratio of the amount of interpolation correction is increased and the ratio of the amount of gain adjustment is decreased.

In the above embodiment, the ratio Q of the amount of interpolation correction and the ratio P of the amount of gain adjustment are determined based on the values of the image signals of the pixels with the same color in the vicinity. However, the present invention is not limited to the above, but may include the case where peripheral pixels do not have the same color.

It is to be understood that the object of the present invention may also be accomplished by the following process. That is, by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium used for supplying the program code include the following. For example a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded via a network.

Further, it is to be understood that the present invention includes the case in which the functions of the above described embodiment are accomplished by executing a program code read out by a computer. The present invention also includes the case of causing an OS (operating system) or the like which operates on the computer to perform a part or all of the actual operations based on instructions of the program code.

Further, it is to be understood that the present invention includes the case in which the functions of the above described embodiment are accomplished by the following process. That is, by writing a program code read out from the storage medium into a memory provided on an expansion board inserted into a computer or in an expansion unit connected to the computer. Then, causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

REFERENCE SIGNS LIST

100 Image pickup apparatus
101 Lens
102 Lens control unit
103 Diaphragm
104 Image pickup device
105 Image pickup pixel group
106 Focus detecting pixel group
107 Pupil dividing optical system
108 Focus detecting unit
109 Spatial frequency detecting unit
110 Determination switching unit
111 Gain adjusting unit
112 Pixel interpolating unit
113 Image processing unit
114 Display unit
115 Recording unit
116 Operation unit
117 Camera controlling unit
501 Micro lens
502 Planar layer
503 Light shielding layer
504 Photoelectric conversion element

The invention claimed is:

1. An image pickup apparatus comprising:
an image pickup device including an image pickup pixel group and a focus detecting pixel group;
a calculation unit for calculating a singular value in the values of signals of pixels existing around the focus detecting pixel group in said image pickup device;
a first generation unit for generating first image data for focus detecting pixels of the focus detecting pixel group by gaining an output signal of the focus detecting pixel;
a second generation unit for generating second image data for the focus detecting pixels based on values of signals in an image pickup pixels of the image pickup pixel group; and
a determination unit for determining respective ratios of the first image data and the second image data in addition of the first image data and the second image data based on the results calculated by said calculation unit.

2. The image pickup apparatus according to claim 1, wherein
said calculation unit calculates a singular value of values of signals in pixels with the same color in the vicinity.

3. The image pickup apparatus according to claim 1, wherein
when the smaller the singular value in the values of signals is, said determination unit increases the ratio of the second image data and decreases the ratio of the first image data, based on the results calculated by said calculation unit.

4. An image pickup apparatus comprising:
an image pickup device including an image pickup pixel group and a focus detecting pixel group;
a calculation unit for calculating a singular value in the values of signals of pixels existing around the focus detecting pixel group in said image pickup device;
an adjustment unit for adjusting a gain of values of signals in the focus detecting pixel group;
a correction unit for correcting an image data corresponding to the position of the focus detecting pixel group based on the values of signals in the image pickup pixel group; and
a determination unit for determining the ratio of adjusting the gain of values of signals in the focus detecting pixel group by said adjustment unit and the ratio of correction by said correction unit based on the results calculated by said calculation unit.

5. A method of controlling an image pickup apparatus including an image pickup device with an image pickup pixel group and a focus detecting pixel group, the method comprising:
a calculation step of calculating a singular value in the values of signals of pixels existing around the focus detecting pixel in said image pickup device;
a first generation step of generating first image data for focus detecting pixels of the focus detecting pixel group by gaining an output signal of the focus detecting pixel;
a second generation step of generating second image data for the focus detecting pixels based on values of signals in an image pickup pixels of the image pickup pixel group; and
a determination step of determining respective ratios of the first image data and the second image data in addition of the first image data and the second image data based on the results calculated in said calculation step.

6. A non-transitory computer readable storage medium storing a program for causing a computer to execute a control method for controlling an image pickup apparatus including an image pickup device with an image pickup pixel group and a focus detecting pixel group, the control method comprising:
a calculation step of calculating a singular value in the values of signals of pixels existing around the focus detecting pixel in the image pickup device;
a first generation step of generating first image data for focus detecting pixels of the focus detecting pixel group by gaining an output signal of the focus detecting pixel;
a second generation step of generating second image data for the focus detecting pixels based on values of signals in an image pickup pixels of the image pickup pixel group; and
a determination step of determining respective ratios of the first image data and the second image data in addition of the first image data and the second image data based on the results calculated in said calculation step.

* * * * *